United States Patent
Harihar

(10) Patent No.: US 12,484,895 B2
(45) Date of Patent: Dec. 2, 2025

(54) SELF KNOTTING SUTURING INSTRUMENT

(71) Applicant: Vivek Harihar, Shimago (IN)

(72) Inventor: Vivek Harihar, Shimago (IN)

(73) Assignee: Vivek Harihar, Shimago (IN)

( * ) Notice: Subject to any disclaimer, the term of this patent is extended or adjusted under 35 U.S.C. 154(b) by 487 days.

(21) Appl. No.: 17/791,569

(22) PCT Filed: Mar. 25, 2020

(86) PCT No.: PCT/IB2020/052787
§ 371 (c)(1),
(2) Date: Jul. 8, 2022

(87) PCT Pub. No.: WO2021/140365
PCT Pub. Date: Jul. 15, 2021

(65) Prior Publication Data
US 2022/0378413 A1  Dec. 1, 2022

(30) Foreign Application Priority Data
Jan. 10, 2020 (IN) .............................. 202041001272

(51) Int. Cl.
*A61B 17/04* (2006.01)
*A61B 17/00* (2006.01)
*A61B 17/06* (2006.01)

(52) U.S. Cl.
CPC .............................. *A61B 17/0491* (2013.01);
*A61B 2017/00831* (2013.01); *A61B 2017/06042* (2013.01)

(58) Field of Classification Search
CPC .................. A61B 17/0491; A61B 2017/06042
See application file for complete search history.

(56) References Cited

U.S. PATENT DOCUMENTS

| | | | | | |
|---|---|---|---|---|---|
| 4,236,470 | A | * | 12/1980 | Stenson | D05B 81/00 112/169 |
| 4,501,211 | A | * | 2/1985 | Seyama | D05B 81/00 112/245 |

(Continued)

OTHER PUBLICATIONS

PCT/IB2020/052787, International Search Report, Patent Cooperation Treaty, Jul. 3, 2020, pp. 1-3.

(Continued)

*Primary Examiner* — Erin Mcgrath
(74) *Attorney, Agent, or Firm* — Kunzler Bean & Adamson

(57) ABSTRACT

An aspect of the present disclosure provides a suturing instrument comprising: a plurality of hollow tubes; at least two stitching arms coupled to first end of the plurality of hollow tubes, the at least two stitching arms capable of moving between an open position and a closed position, wherein in the open position the at least two stitching arms are away from each other, and in the closed position the at least two arms are closer to each other; a needle coupled to at least one of the at least two stitching arms, wherein a suture is looped through the needle to enable suturing when the both arms are moved to the closed position; and a handle comprising at least two members coupled to a second end of the plurality of hollow tubes such that first member of the at least two members is fixed and a second member is movably coupled to the first member, wherein when the at least two members are closer the at least two stitching arms are in closed position, and when the at least two handles are moved away the at least two arms move from the closed position to the open position.

6 Claims, 5 Drawing Sheets

(56) References Cited

U.S. PATENT DOCUMENTS

| | | | | |
|---|---|---|---|---|
| 4,915,107 | A | * | 4/1990 | Rebuffat ............ A61B 17/0469 606/144 |
| 5,603,718 | A | * | 2/1997 | Xu ....................... A61B 17/062 606/147 |
| 5,632,751 | A | * | 5/1997 | Piraka .................. A61B 17/062 606/139 |
| 5,814,054 | A | * | 9/1998 | Kortenbach ......... A61B 17/062 606/147 |
| 2005/0154403 | A1 | * | 7/2005 | Sauer ................ A61B 17/0469 606/139 |
| 2012/0165838 | A1 | * | 6/2012 | Kobylewski ..... A61B 17/06066 606/228 |
| 2018/0000475 | A1 | * | 1/2018 | Patel ...................... A61B 17/04 |
| 2018/0036000 | A1 | * | 2/2018 | Terada ............... A61B 17/0469 |
| 2019/0282228 | A1 | | 9/2019 | Belman et al. |

OTHER PUBLICATIONS

PCT/IB2020/052787, Written Opinion, ISA Patent Cooperation Treaty, Jul. 3, 2020, pp. 1-5.

\* cited by examiner

SELF KNOTTING SUTURING INSTRUMENT

TECHNICAL FIELD

The present disclosure relates to the field of suturing instrument. In particular, the present disclosure pertains to the suturing instrument that enables control of a suturing needle during operation for suturing tissue.

BACKGROUND

Background description includes information that may be useful in understanding the present invention. It is not an admission that any of the information provided herein is prior art or relevant to the presently claimed invention, or that any publication specifically or implicitly referenced is prior art.

Laparoscopic or Robotic Suturing body tissue is a time-consuming aspect of many surgical procedures. Needle holders typically include a textured tip for a secure hold. Usually, the needle holder has a ratchet for locking.

However, application of these type of suturing instruments are limited by the manner in which they access the areas of the human body in need of repair. In particular, the instruments may not be able to access tissue or organs located deep within the body or that are in some way obstructed. Also, many of the instruments are limited by the way they grasp tissue, apply a suture, or recapture a needle and suture. Furthermore, many of the instruments are complicated and expensive to produce due to the numerous parts and/or subassemblies required to make them function properly.

In addition, such type of suturing instruments requires a long learning curve. In other words, the existing surgical instrument are difficult to operate. Further, as operating space for the surgery is very minimal in Laparoscopic/Robotic surgeries, needle may prick the surrounding structure causing abrupt bleeding, bowel and bladder perforation or adjacent organ injury. Furthermore, losing the needle in the abdominal cavity leads to complication.

Therefore, there is a need of an improved suturing instruments that can overcome above-mentioned challenges in the art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE PRESENT DISCLOSURE

Some of the objects of the present disclosure, which at least one embodiment herein satisfies are as listed herein below.

It is an object of the present disclosure to provide a suturing instrument.

It is another object of the present disclosure to provide a suturing instrument that facilitates reducing the complications for suturing.

It is another object of the present disclosure to provide a suturing instrument that facilitates in suturing in confined location.

It is another object of the present disclosure to provide a suturing instrument that is cost efficient and easy to implement.

It is yet another object of the present disclosure to provide a suturing instrument that facilitates in reducing time required for suturing.

SUMMARY

The present disclosure relates to the field of suturing instrument. In particular, the present disclosure pertains to the suturing instrument that enables control of a suturing needle during operation for suturing tissue.

According to an aspect, the present disclosure provides A suturing instrument, said instrument comprising: an enclosure; at least two stitching arms configured with a first end of the enclosure, the at least two stitching arms being capable of moving between an open position and a closed position, wherein in the open position the at least two stitching arms are moved away from each other, and in the closed position the at least two stitching arms are moved closer towards each other; a needle coupled to a first stitching arm of the at least two stitching arms, wherein a first suture is looped through the needle; a knotting unit coupled to a second stitching arm of the at least two stitching arms, the knotting unit comprising a second suture, and being configured to be aligned with the needle when the at least two stitching arms are moved to the closed position; and a handle comprising at least two handle members coupled to a second end of the enclosure such that first handle member of the at least two handle members is fixed to the enclosure and a second handle member is movably configured with the first handle member, wherein when the at least two handle members are moved towards each other enables the at least two stitching arms to move to the closed position, and when the at least two handle members are moved away from each other enables the at least two stitching arms to move from the closed position to the open position, wherein repetitive closing and opening of the at least two stitching arms enables interaction of the needle and the knotting unit facilitates suturing operation.

In an aspect, the instrument comprises a first lever coupled to the first handle member at first end of the first lever and a second end of the first lever is coupled to the at least two stitching arms through a circular member, and wherein the instrument further comprises a second lever that is coupled to the second handle member at a first end of the second lever, and a second end of the second lever is coupled to the circular member such that when the at least two handle members are moved closer to each other causes the circular member to move forward that causes the at least two stitching arms to move to the closed position, and when the at least two handle members are moved away from each other causes the circular member to move towards second end of the enclosure enables the at least two stitching arms to move to the open position.

In an aspect, the knotting unit comprises a rack and pinion mechanism coupled to a third lever and a semicircular member operatively coupled to the rack and pinion mechanism, wherein the rack and pinion mechanism convert linear motion of the third lever into rotary motion for moving the semicircular member around a fixed center in order to move the second suture forward for suturing operation.

In an aspect, the third lever is coupled to the second stitching arm such that opening and closing of the at least two stitching arms moves the third lever linearly in forward and backward direction.

In an aspect, the instrument comprises a set of yarns comprising the first suture and the second suture is disposed inside the enclosure.

In an aspect, when tissue segments are placed between the at least two stitching arms, repetitive opening and closing of the at least two switching arms enables suturing of the tissue segments.

In an aspect, the instrument comprises a fourth lever coupled to the second handle member, and wherein the fourth lever is coupled with a needle lock control switch to enable locking of the needle in vertical position.

In an aspect, the needle is foldably coupled to the first stitching arm.

In an aspect, material of the suture is selected from a group comprising of Vicryl, Monocryl, Nylon, Prolene, Silk.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
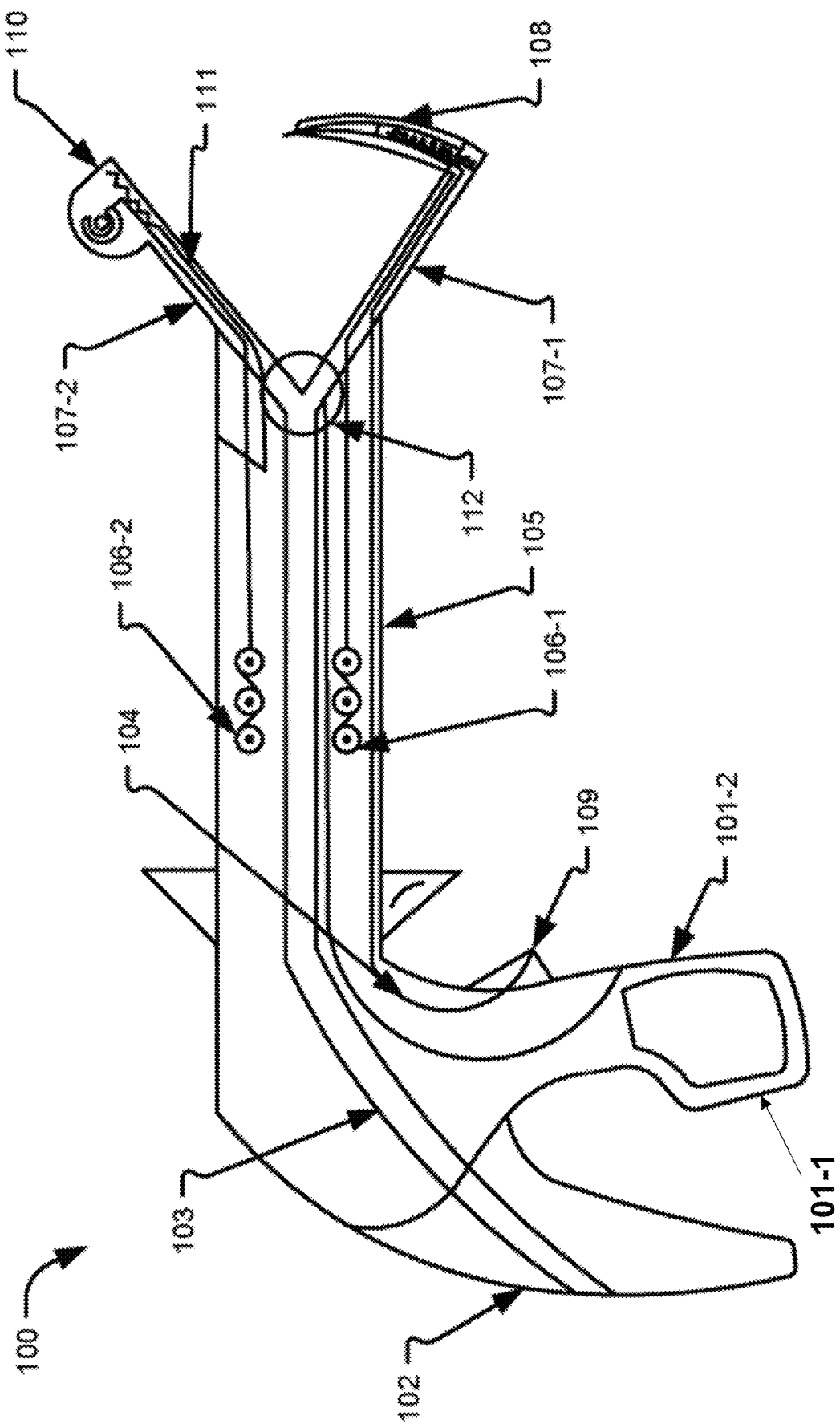
FIG. 1A illustrates an exemplary perspective views of the proposed suturing instrument in an open position, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined, it should be given the broadest definition persons in the pertinent art have given that term as reflected in printed publications and issued patents at the time of filing.

The present disclosure relates to the field of suturing instrument. In particular, the present disclosure pertains to the suturing instrument that enables control of a suturing needle during operation for suturing tissue.

According to an aspect, the present disclosure provides A suturing instrument, said instrument comprising: an enclosure; at least two stitching arms configured with a first end of the enclosure, the at least two stitching arms being capable of moving between an open position and a closed position, wherein in the open position the at least two stitching arms are moved away from each other, and in the closed position the at least two stitching arms are moved closer towards each other; a needle coupled to a first stitching arm of the at least two stitching arms, wherein a first suture is looped through the needle; a knotting unit coupled to a second stitching arm of the at least two stitching arms, the knotting unit comprising a second suture, and being configured to be aligned with the needle when the at least two stitching arms are moved to the closed position; and a handle comprising at least two handle members coupled to a second end of the enclosure such that first handle member of the at least two handle members is fixed to the enclosure and a second handle member is movably configured with the first handle member, wherein when the at least two handle members are moved towards each other enables the at least two stitching arms to move to the closed position, and when the at least two handle members are moved away from each other enables the at least two stitching arms to move from the closed position to the open position, wherein repetitive closing and opening of the at least two stitching arms enables interaction of the needle and the knotting unit facilitates suturing operation.

In an aspect, the instrument comprises a first lever is coupled to the first handle member at first end of the first lever and a second end of the first lever is coupled to the at least two stitching arms through a circular member, and wherein the instrument further comprises a second lever that is coupled to the second handle member at a first end of the second lever, and a second end of the second lever is coupled to the circular member such that when the at least two handle members are moved closer to each other causes the circular member to move forward that causes the at least two stitching arms to move to the closed position, and when the at least two handle members are moved away from each other causes the circular member to move backward second end of the enclosure enables the at least two stitching arms to move to the open position.

In an aspect, the knotting unit comprises a rack and pinion mechanism coupled to a third lever and a semicircular member operatively coupled to the rack and pinion mechanism, wherein the rack and pinion mechanism convert linear motion of the third lever into rotary motion for moving the semicircular member around a fixed center in order to move the second suture forward for suturing operation.

In an aspect, the third lever is coupled to the second stitching arm such that opening and closing of the at least two stitching arms moves the third lever linearly in forward and backward direction.

In an aspect, the instrument comprises a set of yarns comprising the first suture and the second suture is disposed inside the enclosure.

In an aspect, when tissue segments are placed between the at least two stitching arms, repetitive opening and closing of the at least two switching arms enables suturing of the tissue segments.

In an aspect, the instrument comprises a fourth lever coupled to the second handle member, and wherein the fourth lever is coupled with a needle lock control switch to enable locking of the needle in vertical position.

In an aspect, the needle is foldably coupled to the first stitching arm.

In an aspect, material of the suture is selected from a group comprising of Vicryl, Monocryl, Nylon, Prolene, Silk.

Figure 1B:
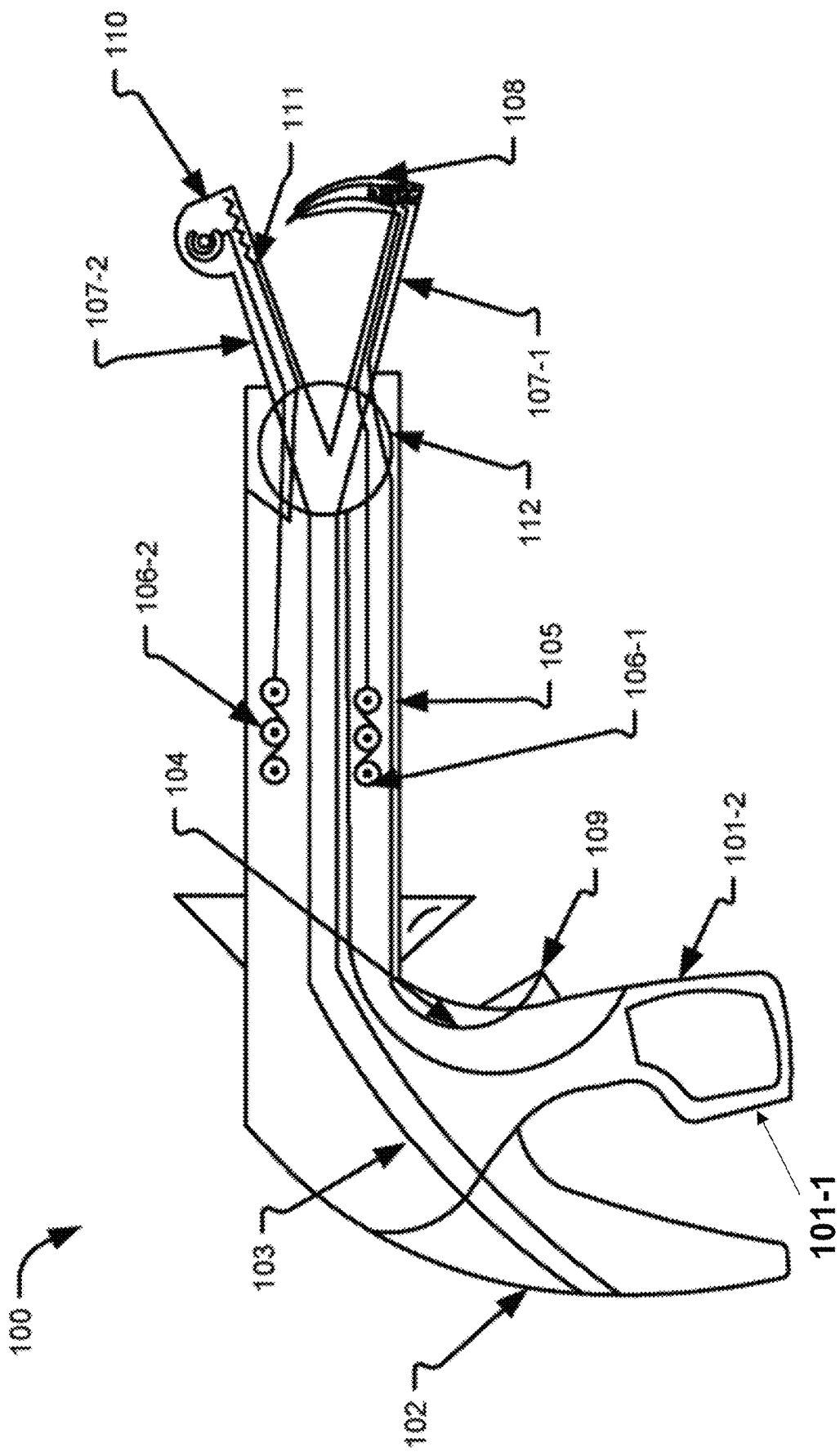
FIG. 1B illustrates an exemplary perspective views of the proposed suturing instrument in a closed position, in accordance with embodiments of the present disclosure.

FIGS. 1A and 1B illustrate exemplary perspective views of the proposed suturing instrument 100 in an open position and closed position respectively, in accordance with embodiments of the present disclosure.

As illustrated in FIG. 1, the proposed suturing instrument 100 (interchangeably referred to as instrument 100 hereinafter) may include a handle comprising a first handle member 101-1 and a second handle member 101-2 (collectively referred to as handle members 101 hereinafter), an enclosure 105 (interchangeably referred to as hollow tube 105 hereinafter). The instrument 100 may include a plurality of stitching arms that includes first stitching arm 107-1 and second stitching arm 107-2 (collectively termed as stitching arms 107, hereinafter). The instrument 100 can be inserted through a cannula into the abdominal cavity of a subject.

In an embodiment, the enclosure 105 can have a first end and a second end coupled to the handle 101. The enclosure 105 may be positioned such that first end of the enclosure 105 is connected to the handle 101.

In an embodiment, the second end of the enclosure can be connected to the stitching arms 107, respectively. In another embodiment, each of the stitching arms 107-1 and 107-2 may be configured to rotate about the second ends of the enclosure 105, respectively.

In an embodiment, the first stitching arm 107-1 may be coupled with a needle 108 and the second stitching arm 107-2 can be coupled with a knotting unit such that rotation of the stitching arms 107-1, 107-2 with needle 108 forms an open jaw position and a closed jaw position. In an embodiment, movement of the stitching arms 107-1 and 107-2 between the open jaw position and the closed jaw position may facilitate suturing operation. The open jaw position may allow the tissue segments to be sutured between the stitching arms inside the abdominal cavity. In the open jaw position, distance between two ends of the stitching arms 107 may be 20 mm. In another embodiment, the closed jaw position may allow the needle 108 to pass through the tissue segments, thereby facilitating suturing operation.

In an embodiment, the instrument 100 includes a first lever 102 that can be coupled to the first handle member 101-1 at first end of the first lever 102 and a second end of the first lever 102 is coupled to the stitching arms 107 through a circular member 112. The instrument 100 can further include a second lever 102 that can be coupled to the second handle member 101-2 at a first end of the second lever 102 and a second end of the second lever 102 can be coupled to the circular member 112 such that when the handle members 101 are moved closer to each other causes the circular member 112 to move forward that can cause the stitching arms 107 to move to the open position, and when the handle members 107 are moved away from each other causes the circular member 112 to move towards second end of the enclosure and hence can enable the stitching arms 107 to move to the closed position.

In an embodiment, the handle 101 may include a control switch 109 that can be configured to allow the handle 101 to move from open position to closed position. In an embodiment, the control switch 109 may be configured to lock the needle 108 at a particular position. In an embodiment, the control switch 109 can be coupled with a fourth lever 104. The fourth lever 104 can further be coupled with the control switch 109 to enable locking of the needle 108 in vertical position at a desired position.

In an embodiment, each of the stitching arms 107-1 and 107-2 may include a suturing thread. The stitching arms 107-2 configured with the needle 108 may include a suturing thread loop at the tip of the needle 108 as shown in FIG. 1. The stitching arm 107-1 without the needle may include a one ended suturing thread. The suturing thread in each of the stitching arms may be connected to suturing thread loop configured inside the elongated member 105-1 and 105-2, respectively.

In an embodiment, the needle 108 can be looped through with a first suture 106-1 and a second suture 106-2 can be passed through the knotting unit 110. Further, movement of a third level 111, that can be coupled to the second stitching member 107-2, causes forward movement of the second suture 106-2.

Figure 2:
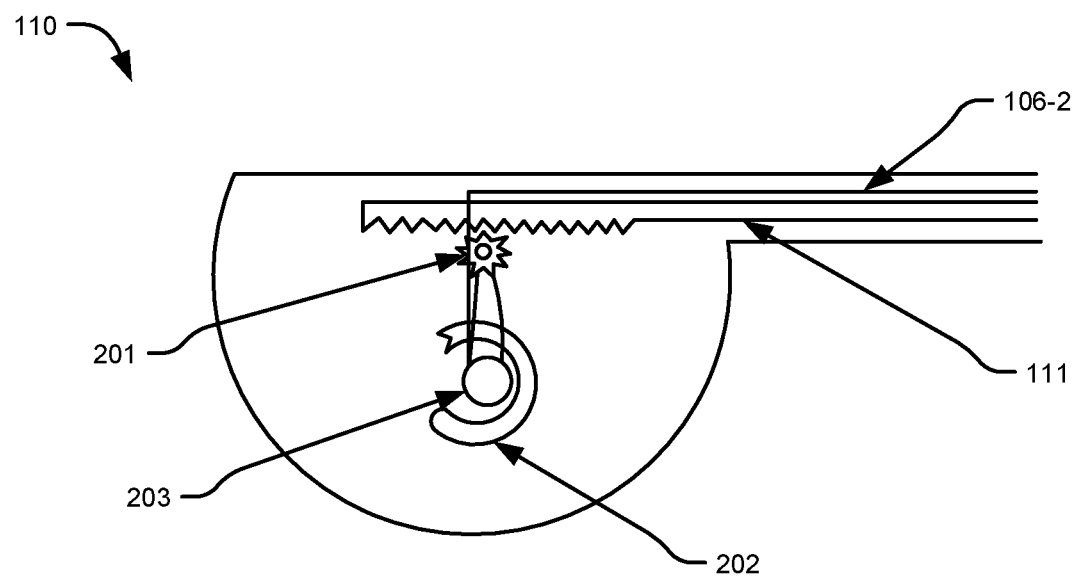
FIG. 2 illustrates an exemplary knotting unit of the proposed suturing instrument in accordance with an embodiment of the present disclosure.

FIG. 2 illustrates an exemplary knotting unit of the proposed suturing instrument in accordance with an embodiment of the present disclosure.

In an embodiment, the knotting unit 110 can comprise a rack and pinion mechanism coupled to a third lever 111. In another embodiment, the lever 111 can be configured with serrations to form rack part of the rack and pinion arrangement, and a circular gear like structure 201 forms pinion part of the rack and pinion arrangement. Further, and a semicircular member 202 can be operatively coupled to the rack and pinion mechanism, wherein the rack and pinion mechanism convert linear motion of the third lever 111 into rotary motion for moving the semicircular member 202 around a fixed center 203 in order to move the second suture 106-2 forward for suturing operation. The third lever 111 can be coupled to the second stitching arm 107-2 such that opening and closing of the stitching arms 107 moves the third lever 111 linearly in forward and backward direction thereby facilitating the suturing operation. The second suture 106-2 can be firmly fixed to the fixed centre 203 to draw the second suture 106-2 from the suture roll. In an embodiment, encasing rubber caps can be used to fill up space between the enclosure 105 and jaws 107 during contraction phase of the jaws 107.

FIGS. 3A-3D illustrate suturing operation of the proposed suturing instrument, in accordance with embodiments of the present disclosure.

Figure 3A:
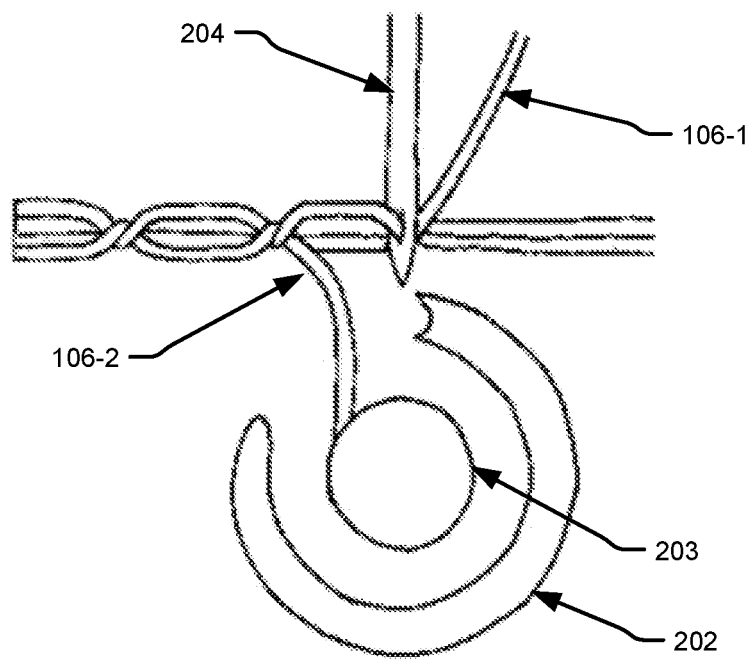
FIGS. 3A-3D illustrate suturing operation of the proposed suturing instrument, in accordance with embodiments of the present disclosure.
Figure 3B:
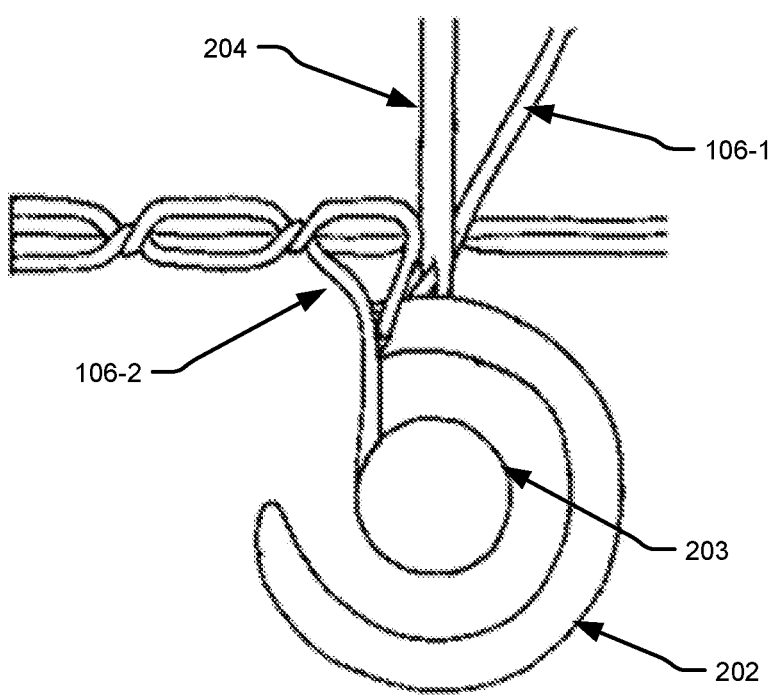
Figure 3C:
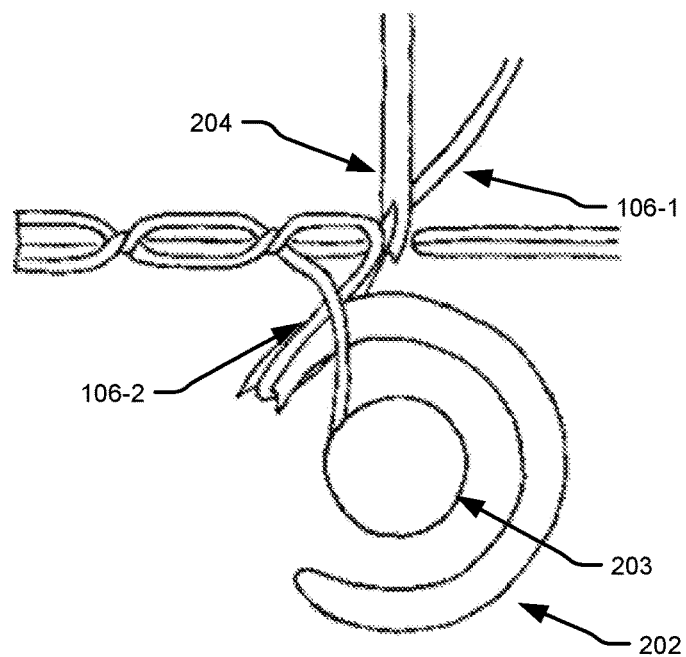
Figure 3D:
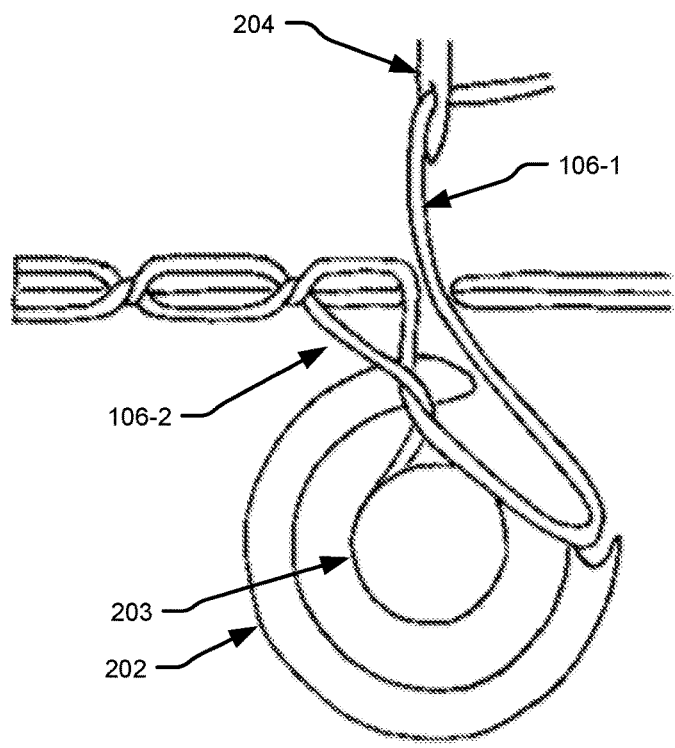

In an embodiment, on closing the handles 101, both the jaw contracts. The needle 204 lowers and penetrates the tissue, carrying first suture 106-1 with it. The needle 204 thus enters the knotting unit 110 in the second stitching arm 107-2 (as shown in FIG. 3A). In an embodiment, the semi-circular-rotating member 202 can hook to the first suture 106-1 present in the needle 204 by its mouth and continues to turn around the fixed centre 203 by dragging the first suture 106-1 (as shown in FIG. 3B). Opening and closing of the stitching arms 107 moves the third lever 111 linearly in forward and backward direction to provide forward movement to the second suture 106-2. In an embodiment, during the course of rotation of the semi-circular-rotating member 202, the first suture 106-1 grasped in the mouth of the semi-circular-rotating member 202 carries like loop of thread around it and as the needle slowly rise above the tissues, making its own suture tout which aids in easy knotting and also preventing the coiling of suture within the knotting unit 110 (as shown in FIG. 3C). In an embodiment, at the end of the semi-circular movement of the semi-circular-rotating member 202a lock knot can be formed and on releasing/opening the handles 101, the semi-circular-rotating member 202 reverts back to its normal position and so the needle 204. The stitch is now ready to be repeated (as shown in FIG. 3D).

At the starting and ending points of suturing, 2-3 sutures are applied at the same point for securing.

In an embodiment, the tissue can be any one or a combination of muscles or fascia.

Thus, the proposed suturing instrument may offer several advantages over conventional suturing instrument used by surgeons in surgeries such as laparoscopic, robotic surgeries for suturing tissue in that it provides a hand-held suturing instrument with relatively simple mechanical construction. The present disclosure provides relative ease of operation for the surgeon with only one hand, thereby enabling the surgeon to move obstructing tissue, debris and biological fluids from the suturing site with a free hand, while eliminating the need for needle holders, pick-up forceps, and other tools normally required for suturing by hand.

In addition, the proposed suturing instrument reduces the time required for the surgery. The instrument may also helpful because of its compact size in minimal access surgeries like laparoscopic and robotic surgeries, where there will be limited operating space. The proposed surgical instrument may be used in different surgical branches such as but not limited to general surgery, Gynecological surgeries, bariatric surgery, Gastro-intestinal surgeries and all open surgeries.

In an exemplary embodiment, diameter of the suturing instrument may be 10 mm. Particularly, when the suturing instrument needs to be inserted into the abdominal cavity through a 12 mm diameter cannula, the diameter of instrument may be 10 mm.

It should be apparent to those skilled in the art that many more modifications besides those already described are possible without departing from the inventive concepts herein. The inventive patent matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should be and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a self-knotting suturing instrument.

The present disclosure provides a self-knotting suturing instrument that facilitates reducing the complications for suturing.

The present disclosure provides a self-knotting suturing instrument that facilitates in suturing in confined location.

The present disclosure provides a self-knotting suturing instrument that is cost efficient and easy to implement.

The present disclosure provides a self-knotting suturing instrument that facilitates in reducing time required for suturing.

I claim:

1. A suturing instrument, said instrument comprising:
an enclosure;
at least two stitching arms connected to a first end of the enclosure, the at least two stitching arms being capable of moving between an open position and a closed position, wherein in the open position the at least two stitching arms are moved away from each other, and in the closed position the at least two stitching arms are moved closer towards each other;
a needle coupled to a first stitching arm of the at least two stitching arms, wherein a first suture is looped through the needle;
a knotting unit coupled to a second stitching arm of the at least two stitching arms, the knotting unit comprising a second suture, and being configured to be aligned with the needle when the at least two stitching arms are moved to the closed position, wherein the knotting unit comprises a rack and pinion mechanism coupled to a third lever and a semicircular member operatively coupled to the rack and pinion mechanism, wherein the rack and pinion mechanism convert linear motion of the third lever into rotary motion for moving the semicircular member around a fixed center, wherein the third lever is coupled to the second stitching arm such that opening and closing of the at least two stitching arms moves the third lever linearly in order to move the second suture forward for suturing operation; and
a handle comprising at least two handle members coupled to a second end of the enclosure such that first handle member of the at least two handle members is fixed to the enclosure and a second handle member is movably configured with the first handle member,
wherein when the first handle member is moved towards the second handle member, the movement enables the at least two stitching arms to move to the closed position, and when the first handle member is moved away from the second handle member, the movement enables the at least two stitching arms to move from the closed position to the open position,
wherein repetitive closing and opening of the at least two stitching arms enables interaction of the needle with the knotting unit that facilitates suturing operation.

2. The instrument as claimed in claim 1, wherein the instrument comprises a first lever, wherein the first lever is coupled to the first handle member at first end of the first lever and a second end of the first lever is coupled to the at least two stitching arms through a circular member, and wherein the instrument further comprises a second lever that is coupled to the second handle member at a first end of the second lever, and a second end of the second lever is coupled to the circular member such that when the first handle member is moved closer to the second handle member, the movement causes the circular member to move forward that causes the at least two stitching arms to close forming the closed position, and when the first handle member is moved away from the second handle member, the movement causes the circular member to move towards second end of the enclosure that enables the at least two stitching arms to open forming the open position.

3. The instrument as claimed in claim 1, wherein the instrument comprises a set of yarns, wherein the set of yarns comprising the first suture and the second suture is disposed inside the enclosure.

4. The instrument as claimed in claim 1, wherein when tissue segments are placed between the at least two stitching arms, repetitive opening and closing of the at least two switching arms enables suturing of the tissue segments.

5. The instrument as claimed in claim 1, wherein the instrument comprises a fourth lever coupled to the second handle member, and wherein the fourth lever is coupled with a needle lock control switch to enable locking of the needle in vertical position.

6. The instrument as claimed in claim 5, wherein the needle is coupled to the first stitching arm.

* * * * *